United States Patent [19]
Wei

[11] Patent Number: 5,988,763
[45] Date of Patent: *Nov. 23, 1999

[54] TWO PIECE VEHICLE WHEEL WITH MECHANICALLY LOCKED SECTIONS

[75] Inventor: Daniel C. Wei, Ann Arbor, Mich.

[73] Assignee: Hayes Lemmerz International, Inc., Northville, Mich.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/844,172

[22] Filed: Apr. 18, 1997

[51] Int. Cl.⁶ ...................................................... B60B 3/04
[52] U.S. Cl. ............................................ 301/63.1; 301/65
[58] Field of Search .................................. 301/17, 35.62, 301/63.1, 64.2, 64.5, 64.7, 65, 35.1, 35.3, 35.51, 95–98; 29/894.322; 152/396, 402, 405, 409, 410, 411, 379.3, 379.4, 379.5

[56] References Cited

U.S. PATENT DOCUMENTS

| | | |
|---|---|---|
| 1,376,205 | 4/1921 | Hoffman . |
| 1,478,437 | 12/1923 | Kaplan . |
| 1,581,679 | 4/1926 | Cook . |
| 1,688,146 | 10/1928 | Klaus . |
| 1,795,821 | 3/1931 | Baldwin ..................................... 301/5.3 |
| 2,241,684 | 5/1941 | Ware ........................................ 301/5.3 |
| 3,117,369 | 1/1964 | Albert . |
| 3,506,311 | 4/1970 | Nobach . |
| 3,612,614 | 10/1971 | Ware . |
| 3,783,927 | 1/1974 | Verdier ..................................... 152/409 |
| 3,859,704 | 1/1975 | Nasson . |
| 3,909,065 | 9/1975 | Main .................................. 301/63.1 X |
| 3,910,638 | 10/1975 | Scott ....................................... 301/63.1 |
| 4,256,348 | 3/1981 | Lester et al. . |
| 4,363,347 | 12/1982 | Baumgartner . |
| 4,518,204 | 5/1985 | Takada . |
| 5,018,795 | 5/1991 | Engerand et al. . |
| 5,257,455 | 11/1993 | Iwatsuki . |
| 5,344,219 | 9/1994 | Adrian et al. . |
| 5,421,642 | 6/1995 | Archibald . |
| 5,803,553 | 9/1998 | Wei ........................................ 301/63.1 |

FOREIGN PATENT DOCUMENTS

| | | |
|---|---|---|
| 537825 | 5/1955 | Belgium ............................... 301/63.1 |
| 0 028 393 | 5/1981 | European Pat. Off. . |
| 0 096 399 | 12/1983 | European Pat. Off. . |
| 1189762 | 10/1959 | France . |
| 3503882A1 | 8/1986 | Germany . |
| 3630226 | 3/1987 | Germany . |
| 59-32502 | 2/1984 | Japan . |
| 95-237044 | 9/1995 | Japan . |
| 895561 | 5/1962 | United Kingdom . |
| WO 85/02586 | 6/1985 | WIPO . |

*Primary Examiner*—Russell D. Stormer
*Attorney, Agent, or Firm*—MacMillan, Sobanski & Todd, LLC

[57] ABSTRACT

A two piece vehicle wheel having a wheel rim secured to a wheel disc by a locking member which is received by complementary grooves formed in the wheel rim and the wheel disc. A layer of resilient material forms a seal between the wheel rim and the wheel disc. The sealing material can included an adhesive.

22 Claims, 5 Drawing Sheets

TWO PIECE VEHICLE WHEEL WITH MECHANICALLY LOCKED SECTIONS

BACKGROUND OF THE INVENTION

This invention relates in general to vehicle wheels and in particular to two piece wheels having a separately formed wheel rim mechanically locked to a wheel disc.

It is known in the art to fabricate a vehicle wheel by attaching a wheel rim to a separately formed wheel disc. Typically, the wheel rim is rolled from steel strip stock and the disc is stamped from steel sheet stock. The rim is welded to the disc to form the wheel. Such a wheel is shown in U.S. Pat. No. 5,257,455 to Iwatsuki. Alternately, the wheel rim can be rolled from steel and the wheel disc cast or forged from a light weight metal, such as aluminum, titanium or magnesium, or an alloy of a light weight metal. Because the metals forming the rim and disc are different, a ferrous weld anchor is usually attached to wheel disc. The wheel rim is welded to the weld anchor to assure that a good weld is formed between the rim and disc. Such a wheel is described in U.S. Pat. No. 3,506,311 to Nobach and is commonly referred to a bimetal wheel. A bimetal wheel combines the economy, flexibility and strength of a steel rim with the pleasing ornamental appearance of three dimensional contours formed in a cast or forged wheel disc.

To enhance the appearance of a two piece wheel, it is known to attach a full face wheel disc which includes the outboard tire retaining flange to a partial wheel rim to form a full face bimetal wheel. When a tire is mounted upon a full face wheel, the joint between the wheel disc and wheel rim is completely hidden and only the wheel disc is visible. A decorative finish is often applied to the face of the wheel disc to further enhance the appearance of the wheel. Examples of typical decorative finishes include metal plating, such as chromium plating, clear coatings and paint.

Figure 1:
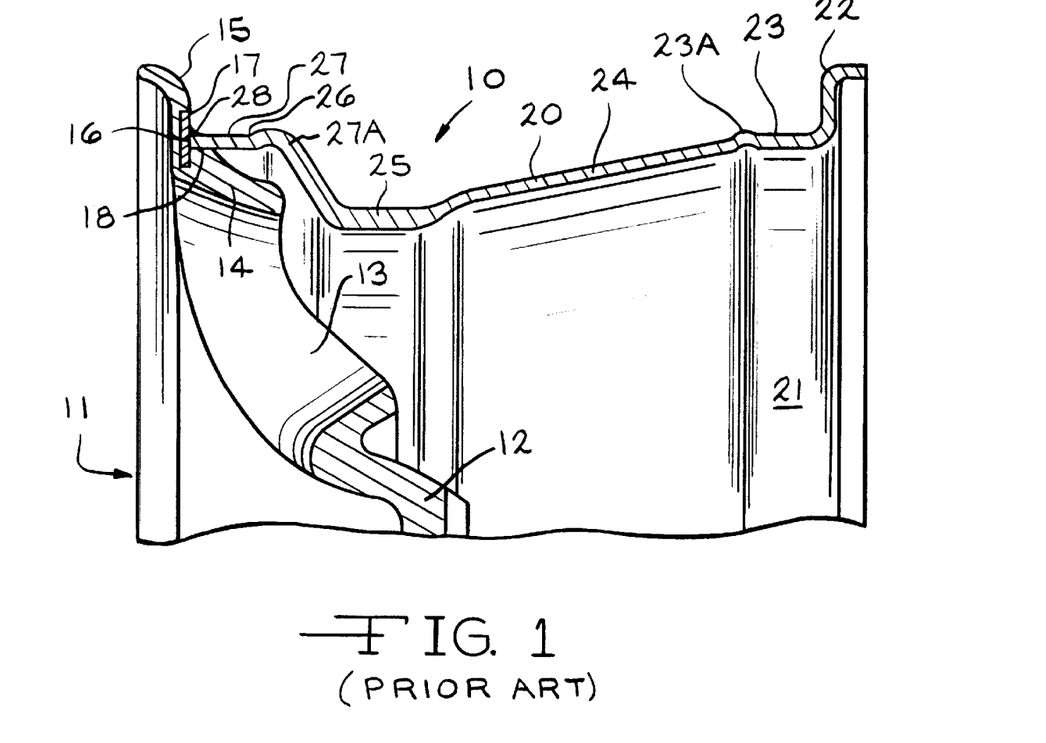
FIG. 1 is a fragmentary sectional view of a prior art two piece wheel.

Referring now to the drawings, there is shown in FIG. 1 a fragmentary sectional view of a typical prior art bimetal full face wheel 10. The wheel 10 is described in the Nobach patent listed above and includes a full face wheel disc 11 formed from a light weight metal or light weight metal alloy by a conventional process, such as gravity, low pressure or die casting. The full face wheel disc 11 includes a central wheel hub 12 which is supported by a plurality of wheel spokes 13 (one shown) within an annular sidewall 14. An outboard tire bead retaining flange 15 extends in a radial outward direction from the sidewall 14.

A ring-shaped weld anchor 16 formed from a ferrous material, such as steel, is partially embedded in the wheel disc sidewall 14. A portion of the weld anchor 16 is exposed to form a welding surface 17. The sidewall 14 further includes a cylindrically-shaped collar 18 which extends axially from the inboard side of the flange 15. The collar 18 extends radially over a portion of the weld anchor 16 to secure the weld anchor 16 to the wheel disc 11.

A conventional partial wheel rim 20 is attached to the inboard side of the wheel disc 11. The wheel rim 20 is formed from steel strip stock with conventional rim roll forming machinery. The wheel rim 20 includes an inboard end 21 which terminates in a conventional inboard tire bead retaining flange 22. An inboard tire bead seat 23 and inboard safety bead 23A are also formed on the inboard end 21 of the wheel rim 20. A leg portion 24 extends in an outward axial direction from the inboard safety bead 23A. A deepwell 25 is formed in the wheel rim 20 adjacent to the leg portion 24. The wheel rim 20 also includes a cylindrically-shaped outboard end 26 which is adjacent to the deepwell 25. The outboard wheel rim end 26 includes an outboard tire bead seat 27 and outboard safety bead 27A. The outboard rim end 26 extends over the wheel disc collar 18 and into contact with the welding surface 17 of the weld anchor 15. The outboard rim end 26 and the wheel disc collar 18 are sized to form a clearance fit therebetween, allowing the wheel rim 20 to be rotated relative to the wheel disc 11.

An alternate structure for the weld anchor is disclosed in U.S. Pat. No. 5,421,642 to Archibald where the weld anchor includes an annular collar which is received by the outboard end of a partial wheel rim. The weld anchor collar positions the wheel rim on the wheel disc.

A continuous circumferential air-tight weld 28 is formed between the wheel rim 20 and the weld anchor 16. Typically, a conventional friction or inertial welding process is used to form the weld 28. During the welding process, the wheel disc 11 is held stationary while the wheel rim 20 is rotated with the outboard rim end 23 pressed against the weld anchor 16. The heat generated by friction partially melts the outboard wheel rim end 26 and the adjacent portion of the weld anchor 16 to form the weld 28.

While the wheel disc is typically welded to the wheel rim, it is also known to heat shrink the wheel rim onto the wheel disc, as shown in U.S. Pat. No. 4,363,347 to Baumgartner and European Patent Application No. 0 096 399 to Stahlschmidt & Malwurm GmbH & Co. KG. The U.S. Patent discloses wheel structures having either cylindrical or conical shrinkage surfaces. The U.S. Patent also discloses optional cutting or rolling of threads on the cylindrical shrinkage surfaces to allow the disc to be threadedly attached to the wheel rim. The European Patent Application discloses conical shrinkage surfaces. The European Patent Application further discloses optional forming of cleats and corresponding grooves, which receive the cleats, on the shrinkage surfaces.

SUMMARY

This invention relates to a two piece vehicle wheel having a wheel rim mechanically secured to a wheel disc with a locking ring.

Typically, two piece vehicle wheels are formed by welding a partial wheel rim to a full face wheel disc. However, the weld must be continuous to avoid leakage of air from a pneumatic tire mounted upon the wheel. It would be desirable to mechanically attach the wheel rim to the wheel disc and thereby eliminate the weld.

The present invention contemplates a vehicle wheel including an annular wheel rim having a first circumferential groove formed in a surface thereof and a wheel disc having a second circumferential groove formed in a surface thereof, the second groove being complementary to the first groove. The wheel also includes a locking member disposed within the first and second grooves to mechanically secure the wheel disc to the wheel rim. The locking member can be a continuous metal ring or a split metal ring. Alternately, the locking member can be formed from an adhesive.

To assure an air-tight seal between the wheel disc and the wheel, the invention further contemplates disposing a circumferential layer of resilient material between the wheel rim and the wheel disc. Additionally, the resilient material forming the seal can include an adhesive.

It is contemplated that the wheel rim can be a partial wheel rim having a cylindrical outboard end, with the first circumferential groove formed in the inner surface thereof. It is further contemplated that the wheel disc has an annular collar extending from an inboard face thereof. The second circumferential groove is formed in the outer surface of the wheel disc collar. The outboard end of the wheel rim extends over the wheel disc collar to form a wheel assembly.

Alternately, the first circumferential groove can be formed in the outer surface of the outboard wheel rim end and second circumferential groove can be formed in the inner surface of the wheel disc collar. With the alternate placement of the grooves, the outboard end of the wheel rim extends into the wheel disc collar to form the wheel assembly.

The invention also contemplates that the wheel rim includes an inboard tire retaining flange and an outboard tire retaining flange and that the wheel disc is disposed within the wheel rim.

The invention also contemplates a process for forming a two piece wheel having a wheel rim mechanically locked to a wheel disc. The process includes providing one of a wheel disc and wheel rim, the wheel disc and wheel rim each having complementary circumferential grooves formed in a surface thereof. A locking member is positioned in the groove formed in one of the wheel disc and wheel rim. The other of the wheel disc and wheel rim is then heated to expand the component. The wheel disc is positioned relative to the wheel rim such that the locking member is received in the grooves formed therein upon cooling and shrinking of the heated wheel component. Finally, the heated wheel component is cooled. Additionally, the process can include, subsequent to positioning the locking member upon the wheel component, applying a layer of resilient sealing material to a surface of the one of the wheel disc and wheel rim.

DETAILED DESCRIPTION OF THE PREFERRED EMBODIMENT

Figure 2:
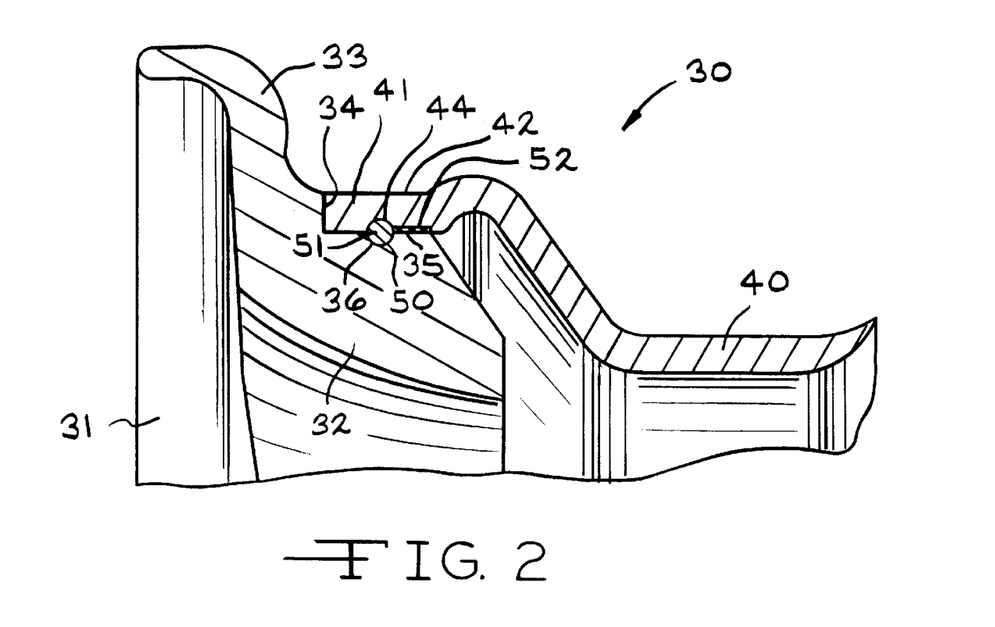
FIG. 2 is a fragmentary sectional view of a two piece wheel in accordance with the invention.

Referring again to the drawings, there is illustrated in FIG. 2 a fragmentary sectional view of a two piece wheel 30. In the preferred embodiment, the wheel 30 is a bimetal wheel which includes a full face wheel disc 31 formed from a light weight metal, such as aluminum, titanium or magnesium, or an alloy of a light weight metal, by a conventional process, such as gravity or low pressure casting, or forging. While the preferred embodiment includes a wheel disc 31 formed from a light weight metal, it will be appreciated that the wheel disc 31 also can be stamped or forged from steel or stainless steel or formed from a plastic. Additionally, the wheel disc 31 can be cast from stainless steel with the Hitchner process. In the preferred embodiment, the wheel disc 31 includes a decorative surface finish (not shown). For example, a layer of plating, such as chrome plating, can be deposited upon a portion of the wheel disc surface, or a layer of paint or a clear coating can be applied to the wheel disc 31.

While the preferred embodiment is described below for a bimetal wheel, it will be appreciated that the invention also can be practiced on a wheel having a disc and rim formed from the same metal, different alloys of the same metal or plastics. For example, a wheel rim formed from a first alloy of aluminum can be attached to a wheel disc formed from a second alloy of aluminum, where the second alloy of aluminum is different from the first alloy of aluminum.

As shown in FIG. 2, the wheel disc 31 includes an annular-shaped sidewall 32. An outboard tire bead retaining flange 33 extends in an outward radial direction from the sidewall 32. The inboard portion of the sidewall 32 has a reduced outer radius which forms a shoulder 34 and an annular collar 35. The collar 35 has a generally cylindrical outer surface which extends axially from the shoulder 34 toward the inboard end of the wheel 30. A circumferential groove 36 having a semi-circular transverse section is formed in the collar 35. The groove 36 defines a plane which is generally perpendicular to the axis of the wheel 30.

The wheel 30 also includes a conventional wheel rim, which in the preferred embodiment is a partial wheel rim 40. The partial wheel rim 40 is formed from steel strip stock with conventional wheel rim roll forming machinery; however, it will be appreciated that the wheel rim 40 also can be formed with a casting or forging process. Additionally, the wheel rim 40 can be formed from a light weight metal, such as aluminum, titanium or magnesium, an alloy of a light weight metal, a plastic or stainless steel. The wheel rim 40 can optionally include a decorative finish (not shown). For example, a layer of plating, such as chrome plating, can be deposited upon a portion of the wheel rim surface, or a layer of paint or a clear coating can be applied to the wheel rim 40.

The wheel rim 40 has a cylindrical outboard end 41 which includes a portion of an outboard tire bead seat 42. A circumferential groove 44 having a semi-circular transverse section is formed by a conventional process, such as rolling or machining, in the cylindrical inner surface of the wheel rim end 41. If the wheel rim 40 is cast, the groove 44 can be formed during the casting operation. The groove 44 defines a plane which is generally perpendicular to the axis of the wheel 30. The plane defined by the groove 44 coincides with the plane defined by the groove 36 formed in the wheel disc collar 35.

As shown in FIG. 2, the outboard wheel rim end 41 extends axially over the wheel disc collar 35 and abuts the wheel disc shoulder 34. The groove 36 formed in the wheel disc collar 35 cooperates with the groove 44 formed in the wheel rim end 41 to define a circumferential locking member seat 50 which has a circular transverse section.

A locking member 51 is disposed in the locking member seat 50. In the preferred embodiment shown in FIG. 2, the locking member 51 is a ring formed from an aluminum alloy and having a circular cross section which is complementary to the transverse section of the seat 50. While aluminum is used in the preferred embodiment for the locking member 51, it will be appreciated that other metals, such as steel also can be used. A lower portion of the locking member 51 is seated in the wheel disc groove 36. The remainder of the locking member 51 extends above the surface of the wheel disc collar 35 and into the groove 44 formed in the outboard end 41 of the wheel rim 40.

While the locking member 51 is shown in FIG. 2 as having a circular cross section, other locking members can be formed having an alternate cross sectional shape, such as square, rectangular, or oval (not shown). When the locking member has an alternate cross sectional shape, the grooves 44 and 36 are formed in the wheel rim 40 and disc 31, respectively, having transverse sections which are complementary to the cross sectional shape of the locking member.

As will be explained below, the invention contemplates heat shrinking the locking member 51 into the groove 36 in the collar 35 and then heat shrinking the outboard wheel rim end 41 onto the wheel disc collar 35. The contraction of the locking member 51 and the outboard wheel rim end 41 upon cooling forces the locking member 51 into the grooves 36 and 44. Accordingly, the locking member 51 mechanically secures, or locks, the wheel rim end 41 on the wheel disc collar 35. Alternately, the locking member 51 can be slit (not shown) to allow mechanical expansion thereof for seating in the groove 36.

A circumferential layer of sealing material 52 is disposed between the inner surface of the wheel rim end 41 and the outer surface of the wheel disc collar 35 to form an air-tight seal therebetween. In the preferred embodiment, an adhesive is used for the sealing material. Alternately, a resilient material can form the sealing layer 52. While the sealing layer 52 is illustrated in FIG. 2 as being on the inboard side of the locking member 51, the layer 52 also can be alternately positioned on the outboard side of the locking member 51, in one of the grooves 36 or 44, or extended axially from the wheel disc shoulder 34 across the entire surface of the wheel disc collar 35.

The invention further contemplates an alternate embodiment of the wheel 30 having a locking member formed from an adhesive material (not shown) which cures to form a ring having sufficient shear strength to mechanically lock the wheel rim on the wheel disc. The invention contemplates that the adhesive ring would permanently bond the wheel rim to the wheel disc. The adhesive also forms an air-tight seal between the wheel rim and the wheel disc collar. Thus, the sealing layer 52 shown in FIG. 2 would not be needed.

Figure 3:
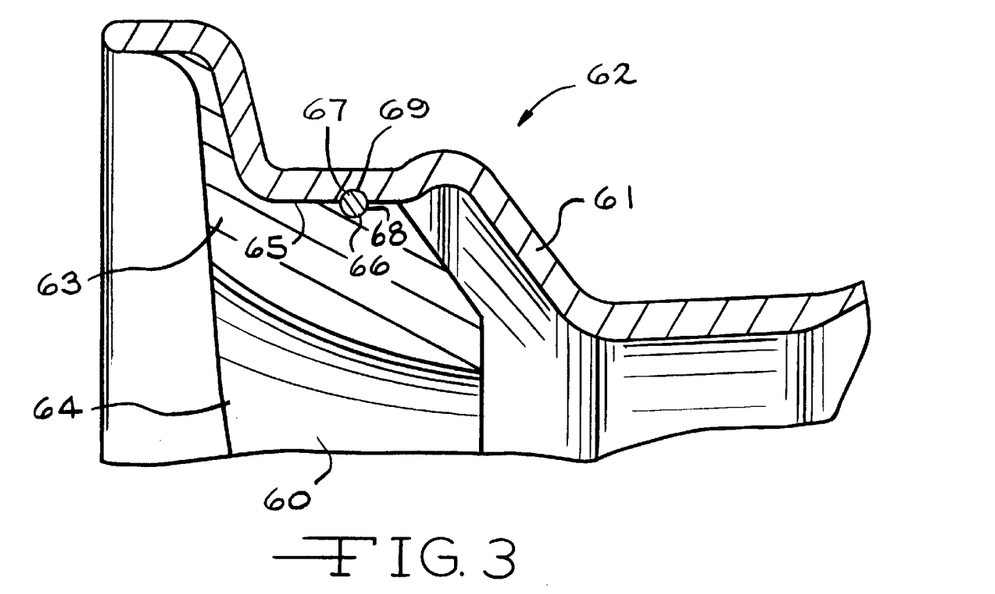
FIG. 3 is a fragmentary sectional view of an alternate embodiment of the wheel shown in FIG. 2.

Another alternate embodiment of the invention is shown in FIG. 3 where a wheel spider 60 is disposed within a full wheel rim 61 to form a wheel assembly 62. The full face wheel rim 61 includes both inboard and outboard tire bead retaining flanges. The wheel spider 60 includes a central hub (not shown) supported within an annular sidewall 63 by a plurality of radially extending spokes 64 (one shown). The sidewall 63 includes a cylindrical collar 65 having a circumferential groove 66 formed therein. The wheel rim 61 has a circumferential groove 67 formed on an inner surface adjacent to the groove 66 in the wheel spider 60. The grooves 66 and 67 cooperate to define a locking member seat 68. A locking member 69 is disposed in the locking member seat 68 to secure the wheel spider 60 within the wheel rim 61. Because the wheel assembly 62 includes a full wheel rim 61, a layer of sealing material is not needed between the wheel rim 61 and the wheel spider 60.

Figure 4:
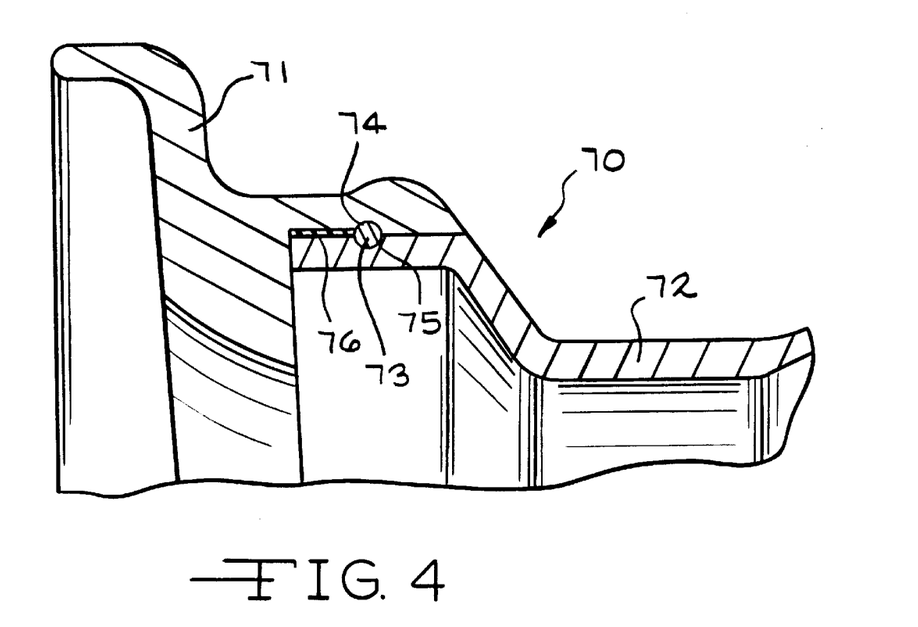
FIG. 4 is a fragmentary sectional view of another embodiment of the wheel shown in FIG. 2.

Another embodiment of the invention is illustrated in FIG. 4 where a wheel assembly 70 includes a wheel disc 71 which is heat shrunk onto the outboard end of a partial wheel rim 72. A ring shaped locking member 73 is received by complementary grooves 74 and 75 formed in the wheel disc 71 and wheel rim 72, respectively. A lower portion of the locking member 73 is seated in the wheel rim groove 75. The remainder of the locking member 73 extends above the surface of the outboard end of the wheel rim 72 and into the groove 74 formed in the wheel disc 71. The locking member 73 mechanically secures, or locks, the wheel disc 71 on the wheel rim 72. A layer of resilient sealing material 76 is disposed between the wheel disc 71 and wheel rim 72 to form a circumferential air-tight seal therebetween.

Figure 5:
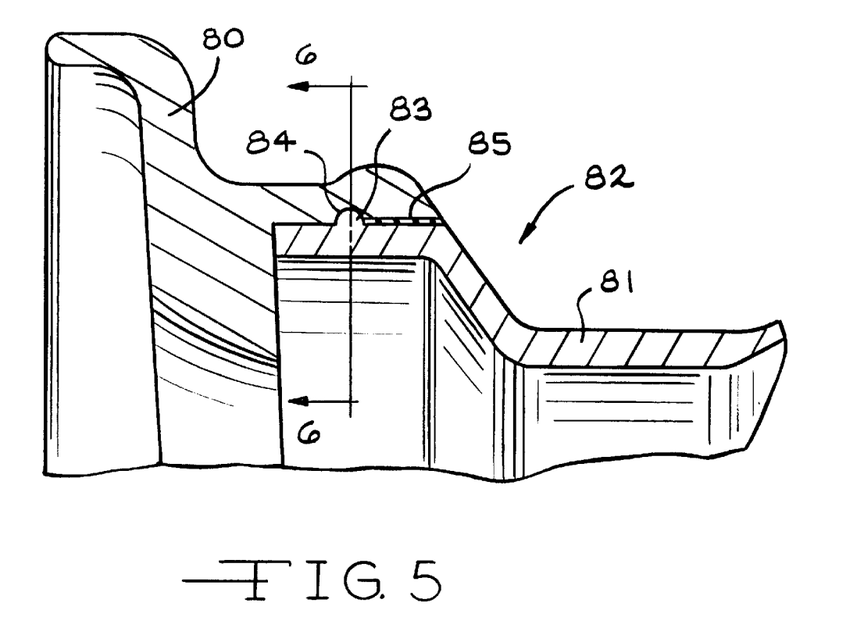
FIG. 5 is a fragmentary sectional view of an alternate embodiment of the wheel shown in FIG. 4.

An alternate embodiment of the wheel assembly 70 is shown in FIG. 5 which includes a fall face wheel disc 80 heat shrunk onto the outboard end of a partial wheel rim 81 to form a wheel assembly 82. The partial wheel rim 81 includes a circumferential bead 83 formed on the outboard end thereof which is received in a corresponding groove 84 formed on an inner surface of the wheel disc 80. The bead 83 cooperates with the groove 84 to mechanically secure the wheel disc 80 to the wheel rim 81. A layer of resilient sealing material 85 is disposed between the wheel disc 80 and the wheel rim 81 to form a circumferential air-tight seal therebetween. In the preferred embodiment, the sealing material 85 includes an adhesive.

Figure 6:
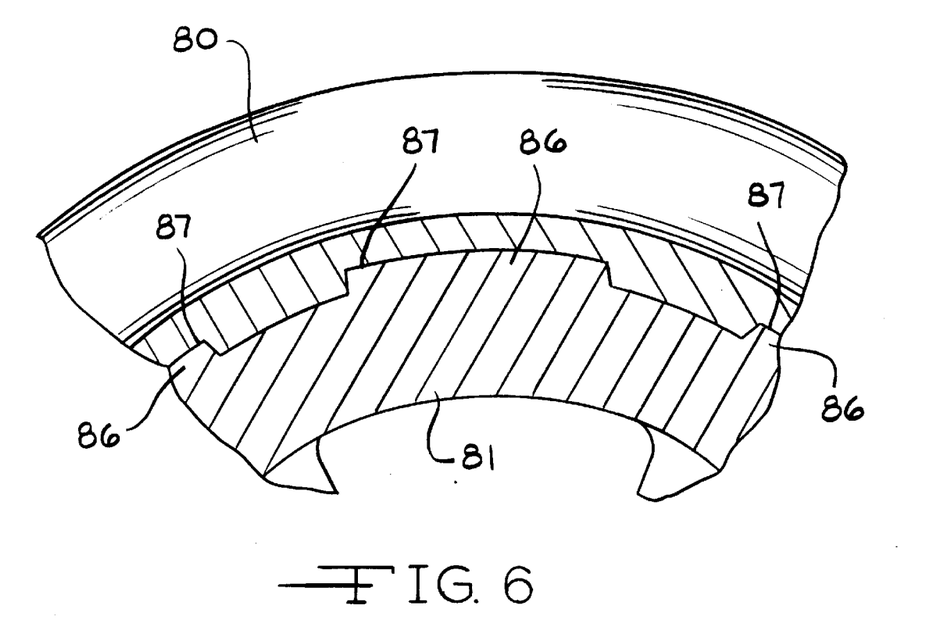
FIG. 6 is a fragmentary sectional view taken along line 6—6 in FIG. 5.

In the preferred embodiment, the circumferential bead 83 is continuous; however, the invention also contemplates that the circumferential bead can comprise of a plurality of bead segments 86, as shown in FIG. 6. Each of the segments 86 would be received in a corresponding groove segment 87 formed in the inner surface of the wheel disc 80.

Figure 7:
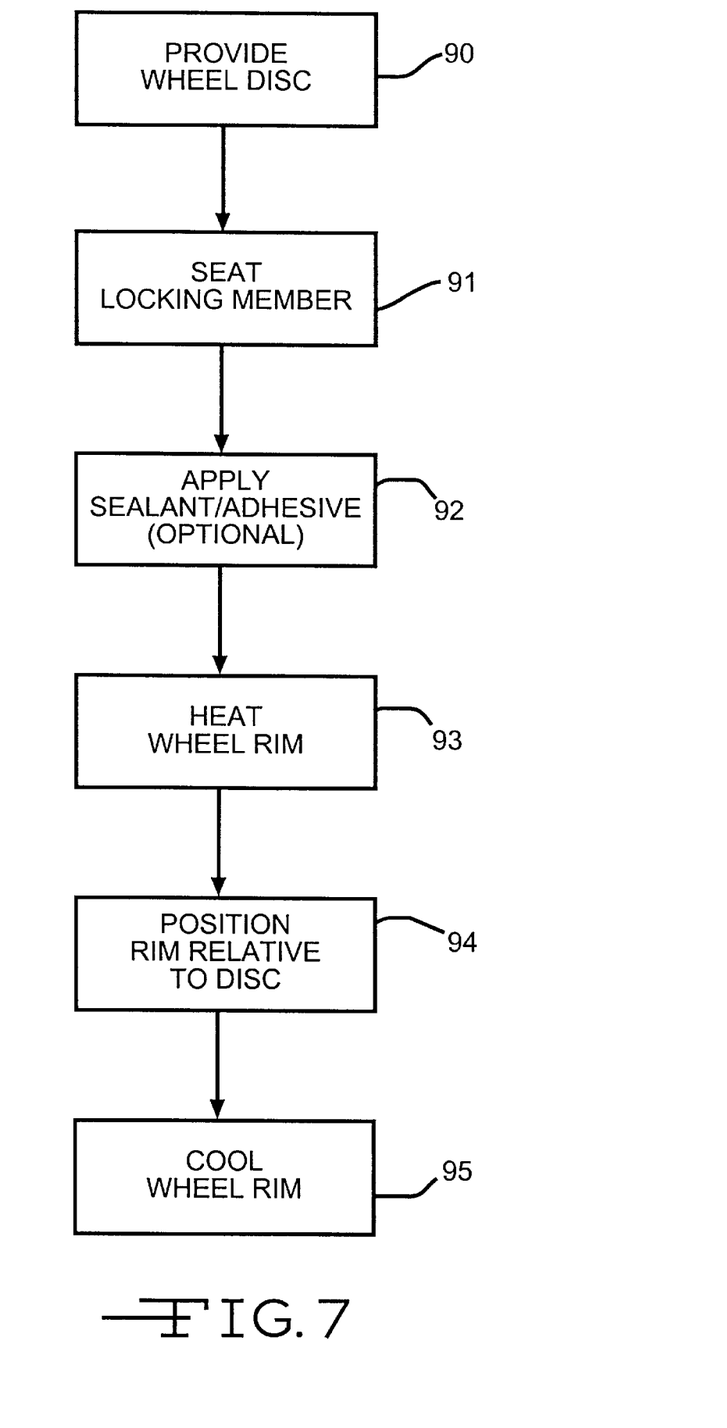
FIG. 7 is a flow chart for a process for fabricating the wheels shown in FIGS. 2 and 3.

The invention also contemplates a process for fabricating each of the wheels described above. A flow chart is shown in FIG. 7 for the process for fabricating the wheels shown in FIGS. 2 and 3. A wheel disc having a circumferential groove formed in a collar which extends axially from an inboard face is provided in functional block 90.

In functional block 91, a locking member is seated in the groove in the wheel disc collar. In the preferred embodiment, the locking member is expanded by heating to fit over the surface of the wheel disc collar. The locking member contracts into the receiving groove formed in the collar as it cools. Alternately, the locking member can be formed from a resilient material which is split to allow mechanical expansion thereof for placement in the receiving groove. Additionally, a bead of adhesive material can be deposited in the groove which, upon curing, forms a locking member.

A circumferential layer of sealing material is applied to a portion of the wheel disc collar in functional block 92. In the preferred embodiment, the sealing material includes an adhesive. The sealing material can be applied continuously around the collar or in a series of discrete segments. The sealing material can be formed as a self-adhering tape or as a semi-solid material which is sprayed or rolled onto the wheel disc collar. When a semi-solid material is used, the material can be applied as a plurality of beads or as a continuous layer. The amount of sealing material applied and method of application is determined by the specific structures of the wheel disc and rim and the characteristics of the sealing material used. As described above, the use of a sealing material is not required for the wheel assembly 62 shown in FIG. 3 or when a bead of adhesive forms the locking member. Accordingly, the step shown in functional block 92 is optional.

The outboard end of a wheel rim having a circumferential groove formed in an inner surface is expanded by heating in functional block 93. As described above, the circumferential groove in the wheel rim is complementary to the circumferential groove in the wheel disc collar. The wheel rim end is heated by a conventional means, such as electric induction, electric resistance, or infrared heating elements or by placing the wheel rim end in a gas-fired or electric resistance furnace. The outboard end of the wheel rim is heated sufficiently to expand the inner diameter thereof to clear portion of the locking member which extends above the surface of the wheel disc collar.

The wheel disc collar is inserted into the outboard end of the wheel rim in functional block 94 with the grooves adjacent to one another. In functional block 95, the heated wheel rim is cooled to heat shrink the wheel rim onto the wheel disc collar. As described above, the locking member cooperates with the grooves formed in the wheel rim and the wheel disc to mechanically lock the wheel rim on the wheel disc. As the heated wheel component contracts any sealing material is compressed between the wheel rim and the wheel disc. As described above, the sealing material is resilient and can include an adhesive. Compression of the sealing material provides an air-tight seal between the wheel disc and the wheel rim. In the preferred embodiment, the sealing material is applied as a plurality of beads which are spread to form a continuous layer. This precludes excess sealing material being squeezed out of the joint as the heated wheel component contracts. Functional block 95 also includes curing of any adhesive included in the sealing material.

Figure 8:
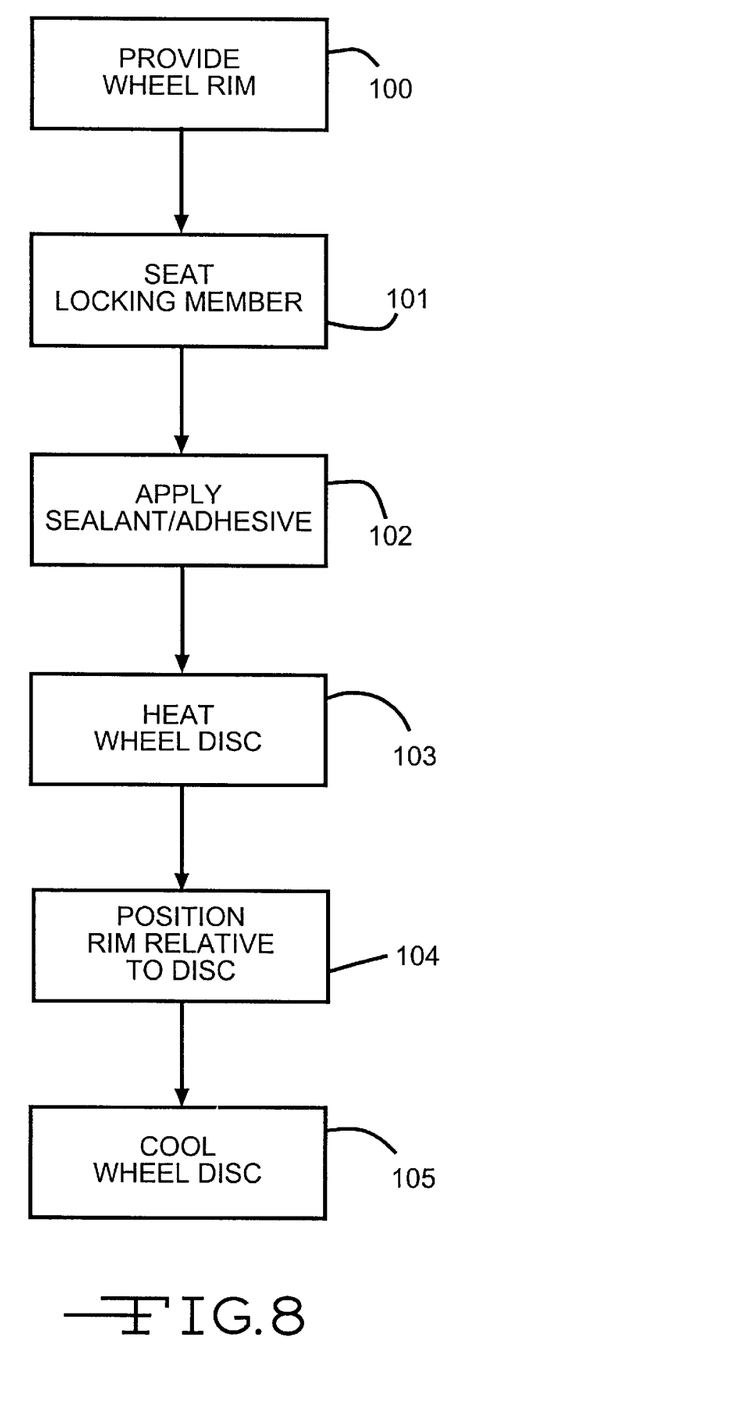
FIG. 8 is a flow chart for a process for fabricating the wheels shown in FIGS. 4 through 6.

A flow chart is shown in FIG. 8 for the process for fabricating the wheels shown in FIGS. 4 through 6. A partial wheel rim having a cylindrical outboard end is provided in functional block 100. The wheel rim includes a circumferential groove which is formed in the outer surface of the outboard end thereof.

In functional block 101, a locking member is seated in the groove in the outboard end of the wheel rim. In the preferred embodiment, the locking member is expanded by heating to fit over the surface of the wheel rim end. The locking member contracts into the receiving groove formed in the rim end as it cools. Alternately, the locking member can be formed from a resilient material which is split to allow mechanical expansion thereof for placement in the receiving groove. Additionally, a bead of adhesive material can be deposited in the groove which, upon curing, forms a locking member.

A circumferential layer of sealing material is applied to a portion of the outboard end of the wheel rim in functional block 102. In the preferred embodiment, the sealing material includes an adhesive. The sealing material can be applied continuously around the collar or in a series of discrete segments. The sealing material can be formed as a self-adhering tape or as a semi-solid material which is sprayed or rolled onto the wheel disc collar. When a semi-solid material is used, the material can be applied as a plurality of beads or as a continuous layer. The amount of sealing material applied and method of application is determined by the specific structures of the wheel disc and wheel rim and the characteristics of the sealing material used.

A collar formed on an inboard face of a wheel disc is expanded by heating in functional block 103. The wheel disc collar includes a circumferential groove formed in an inner surface thereof. As described above, the circumferential groove in the wheel disc collar is complementary to the groove in the outboard end of the wheel rim. The wheel disc is heated by a conventional means, such as electric induction, electric resistance, or infrared heating elements or by placing the wheel disc collar in a gas-fired or electric resistance furnace. The collar is heated sufficiently to expand the inner diameter thereof to clear the portion of the locking member which extends above the surface of the wheel rim end.

The wheel rim is inserted into the wheel disc collar in functional block 104 with the grooves adjacent to each other.

In functional block 105, the heated wheel disc is cooled to heat shrink the wheel disc collar onto the outboard end of the wheel rim. As described above, the locking member cooperates with the grooves formed in the wheel rim end and the wheel disc collar to mechanically lock the wheel disc on the wheel rim end. As the heated wheel component contracts the sealing material is compressed between the wheel rim and the wheel disc. As described above, the sealing material is resilient and can include an adhesive. Compression of the sealing material provides an air-tight seal between the wheel disc and the wheel rim. In the preferred embodiment, the sealing material is applied as a plurality of beads which are spread to form a continuous layer. This precludes excess sealing material being squeezed out of the joint as the heated wheel component contracts. Functional block 105 also includes curing of any adhesive included in the sealing material.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A two piece vehicle wheel comprising:

an annular partial wheel rim adapted to carry a pneumatic tire having a tire bead retaining flange formed on an inboard end thereof and a cylindrical inboard end, said cylindrical inboard end having a first circumferential groove formed in a surface thereof, said partial wheel rim further including at least a portion of a deep well;

a full face wheel disc having an outboard tire bead retaining flange formed thereon and an inboard surface, said inboard surface having a cylindrical shoulder extending axially therefrom, said cylindrical shoulder having a second circumferential groove formed in a surface thereof, said second groove being complementary to said first groove; and a metal locking member disposed within said first and second grooves; said metal locking member mechanically securing said full face wheel disc to said partial wheel rim to form a wheel assembly.

2. A vehicle wheel as described in claim 1 further including a circumferential layer of resilient material disposed between said cylindrical outboard end of said wheel rim and said annular collar extending from said wheel disc, said resilient material forming an air-tight seal therebetween.

3. A vehicle wheel as described in claim 2 wherein said resilient material includes an adhesive.

4. A vehicle wheel as described in claim 2 wherein said locking member is a continuous ring.

5. A vehicle wheel as described in claim 2, wherein said locking member is a split retaining ring.

6. A vehicle wheel as described in claim 1 wherein said locking member is formed from an adhesive, said adhesive forming a permanent bond and a seal between said wheel rim and said wheel disc.

7. A vehicle wheel as described in claim 1 wherein said wheel rim is a partial wheel rim having a cylindrical outboard end, said first circumferential groove being formed in an outer surface of said outboard wheel rim end and said wheel disc includes an annular collar extending from an inboard face thereof, said second circumferential groove being formed in an inner surface of said wheel disc collar, and further wherein said outboard end of said wheel rim extends into said wheel disc collar to form said wheel assembly.

8. A vehicle wheel as described in claim 1 wherein said wheel rim includes an inboard tire retaining flange and an outboard tire retaining flange, said first circumferential groove being formed in an inner surface of said wheel rim, and said wheel disc includes an annular sidewall, said second circumferential groove being formed in said annular sidewall, and further wherein said wheel disc is disposed within said wheel rim.

9. A vehicle wheel as described in claim 8 wherein said locking member is a continuous ring.

10. A vehicle wheel as described in claim 8 wherein said locking member is a split retaining ring.

11. A vehicle wheel comprising:
- a partial wheel rim having a cylindrical outboard end, said outboard end having an outer surface;
- a circumferential bead formed in said outer surface of said wheel rim end;
- a full face wheel disc having an inboard face;
- an annular collar formed on said inboard face of said wheel disc, said collar extending axially from said inboard face; said collar having an axial bore formed therein, said bore defining an uninterrupted inner cylindrical surface; and
- a circumferential groove formed in said inner cylindrical surface of said bore in said wheel disc collar, said groove being complementary to said bead formed on said wheel rim end, said outboard wheel rim end extending into said bore in said wheel disc collar with said groove cooperating with said bead to mechanically secure said wheel disc upon said wheel rim.

12. A vehicle wheel as described in claim 11 further including a seal formed from a resilient material disposed between said outboard end of said wheel rim and said inner cylindrical surface of said bore in said wheel disc collar.

13. A vehicle wheel as describe in claim 12 wherein said resilient material includes an adhesive.

14. A vehicle wheel as described in claim 11 wherein said bead is intermittent and said groove also is intermittent and complementary to said intermittent bead, said intermittent bead and intermittent groove being formed separately from one another.

15. A process for fabricating vehicle wheel assembly comprising the steps of:

(a) providing a wheel disc, the wheel disc including an annular surface having a circumferential groove formed therein;

(b) providing a wheel rim, the wheel rim including an annular surface having a circumferential groove formed therein, the wheel rim groove being complementary to the wheel disc groove;

(c) seating a locking member in the groove formed in the surface of the one of the wheel disc and wheel rim provided in steps (a) and (b);

(d) heating the other of the wheel disc and wheel rim;

(e) positioning the wheel disc relative to the wheel rim such that the locking member will be received in the groove formed in the surface of the other of the wheel disc and wheel rim upon cooling thereof; and (f) cooling the other of the wheel disc and wheel rim.

16. The process described in claim 15 further including, subsequent to step (c), applying a layer of resilient sealing material to a surface of the one of the wheel disc and wheel rim provided in steps (a) and (b).

17. The process described in claim 16 wherein the resilient sealing material includes an adhesive.

18. The process described in claim 16 wherein the locking member is a continuous ring and step (c) includes heating the ring to seat the ring in the groove.

19. The process described in claim 16 wherein the locking member is a split ring and step (c) includes mechanically expanding the ring to seat the ring in the groove.

20. The process described in claim 16 wherein the locking member includes a bead of adhesive which is applied to the groove in step (b).

21. The process described in claim 19 wherein step (e) includes sliding the outboard end of the wheel rim over an annular collar which extends from the inboard face of the wheel disc.

22. The process described in claim 19 wherein step (e) includes sliding the outboard end of the wheel rim into an annular collar which extends from the inboard face of the wheel disc.

* * * * *